(12) United States Patent
Kawano et al.

(10) Patent No.: US 7,612,709 B2
(45) Date of Patent: Nov. 3, 2009

(54) RADAR DEVICE AND PROCESSING METHOD OF THE SAME

(75) Inventors: Yoichi Kawano, Kawasaki (JP); Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/175,081

(22) Filed: Jul. 17, 2008

(65) Prior Publication Data

US 2009/0009384 A1 Jan. 8, 2009

Related U.S. Application Data

(63) Continuation of application No. PCT/JP2006/300552, filed on Jan. 17, 2006.

(51) Int. Cl.
*G01S 13/08* (2006.01)
(52) U.S. Cl. .................................. 342/135; 342/195
(58) Field of Classification Search .................. 342/195, 342/135
See application file for complete search history.

(56) References Cited

U.S. PATENT DOCUMENTS

| | | | | |
|---|---|---|---|---|
| 4,053,888 | A | * | 10/1977 | Robin et al. .................. 342/89 |
| 4,628,312 | A | * | 12/1986 | Hwang et al. .......... 340/825.64 |
| 4,709,237 | A | * | 11/1987 | Poullain et al. ............. 342/203 |
| H001044 | H | * | 4/1992 | Waters .......................... 368/47 |
| 5,909,675 | A | | 6/1999 | Chiodini |
| 6,329,929 | B1 | * | 12/2001 | Weijand et al. ......... 340/870.25 |
| 7,110,732 | B2 | | 9/2006 | Mostafa et al. |
| 7,148,839 | B2 | * | 12/2006 | Chen .......................... 342/125 |
| 7,280,026 | B2 | | 10/2007 | Honya et al. |
| 7,525,477 | B2 | * | 4/2009 | Kurashima et al. .......... 342/135 |
| 7,539,245 | B2 | * | 5/2009 | Venna et al. ................. 375/239 |
| 2002/0181614 | A1 | | 12/2002 | Mostafa et al. |
| 2005/0134498 | A1 | | 6/2005 | Honya et al. |
| 2005/0270231 | A1 | * | 12/2005 | Small .......................... 342/194 |
| 2006/0103535 | A1 | * | 5/2006 | Pahlaven et al. ......... 340/572.1 |
| 2006/0181393 | A1 | * | 8/2006 | Raphaeli ..................... 340/10.1 |
| 2009/0009384 | A1 | * | 1/2009 | Kawano et al. .............. 342/135 |

FOREIGN PATENT DOCUMENTS

JP 5-087913 A 4/1993

(Continued)

OTHER PUBLICATIONS

"Remote bistatic receiver synchronization using DLL techniques", Aguasca, A.; Broquetas, A.; Fdez de Muniain, J.; Ambros, A. Radar 92. International Conference Oct. 12-13, 1992 pp. 489-492.*

(Continued)

*Primary Examiner*—John B Sotomayor
(74) *Attorney, Agent, or Firm*—Arent Fox LLP (57) ABSTRACT

A radar device has a clock generator (131) generating a base clock; a transmitter (121 to 125) transmitting transmission pulses as gradually increasing a displacement amount with respect to each edge of the base clock; and a receiver (101 to 106) receiving reflected waves of the transmitted transmission pulses in synchronization with the edges of the base clock.

11 Claims, 6 Drawing Sheets

FOREIGN PATENT DOCUMENTS

| | | | |
|---|---|---|---|
| JP | 8-194062 A | | 7/1996 |
| JP | 8-213944 A | | 8/1996 |
| JP | 10-135869 A | | 5/1998 |
| JP | 2000230975 A | * | 8/2000 |
| JP | 2002-374181 A | | 12/2002 |
| JP | 2005-181180 A | | 7/2005 |
| WO | WO 2007083355 A1 | * | 7/2007 |

OTHER PUBLICATIONS

"Approach of adaptive synchronization for bistatic SAR real-time imaging", IEEE Transactions on Geoscience and Remote Sensing, Sep. 2007, vol. 45, No. 9, p. 2695-700, Wenqin-Wang.*

* cited by examiner

FIG. 7

RADAR DEVICE AND PROCESSING METHOD OF THE SAME

TECHNICAL FIELD

The present invention relates to a radar device and a processing method of the radar device.

BACKGROUND

A radar device transmits transmission pulses and receives pulse signals reflected by a target to measure a distance from the target based on the time differences between the transmission pulses and reception pulses.

Japanese Patent Application Laid-Open No. 2002-374181 discloses a radio frequency receiver. In the radio frequency receiver, after passing an input modulated signal through a band-pass filter, a sample-and-hold circuit samples the signal using a subsampling frequency, which is sufficiently lower than a radio carrier frequency but has a bandwidth twice as a payload bandwidth, to digitalize the signal. The digitalized signal is supplied to two digital mixers and a common-mode component (I) and an orthogonal component (Q) of the payload are generated.

Japanese Patent Application Laid-Open No. 8-213944 discloses, in FIG. 1, an analog-digital converting means having a clock, a sample-and-hold circuit and an analog-digital converter.

Japanese Patent Application Laid-Open No. 10-135869 listed below discloses a receiving device. The receiving device controls to set a time window, which includes all detected peak values that exceed a predetermined threshold value, in each symbol period. Only during the time windows, sampling pulses are sequentially output to an analog sample-and-hold circuit to sample and hold correlation output signals. Then, after the time window ends, the receiving device also controls a switch to sequentially input each sampling value to an A/D converter and convert the values into digital signals.

SUMMARY

An aspect of the present invention provides a radar device having a clock generator generating a base clock; a transmitter transmitting transmission pulses as gradually increasing a displacement amount with respect to each edge of the base clock; and a receiver receiving reflected waves of the transmitted transmission pulses in synchronization with the edges of the base clock.

DETAILED DESCRIPTION OF THE EMBODIMENTS

Figure 4:
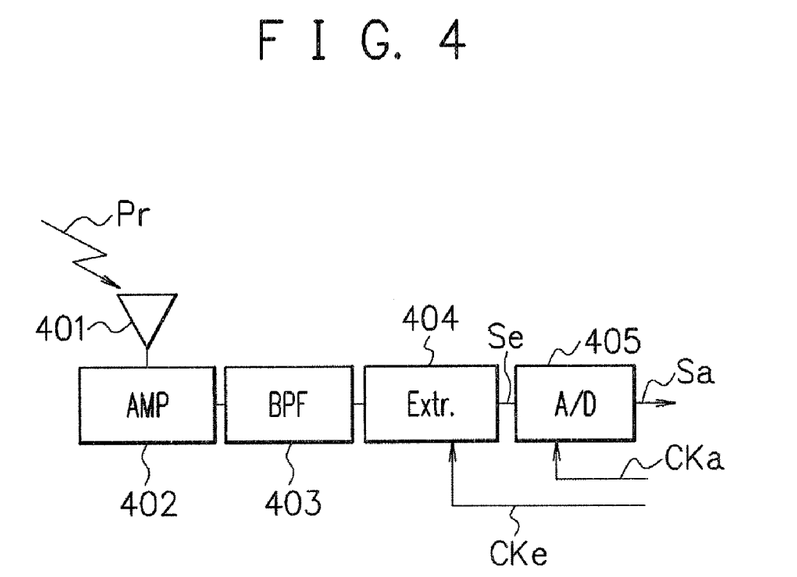
FIG. 4 is a diagram showing a configuration of a receiver of the radar device.
Figure 5:
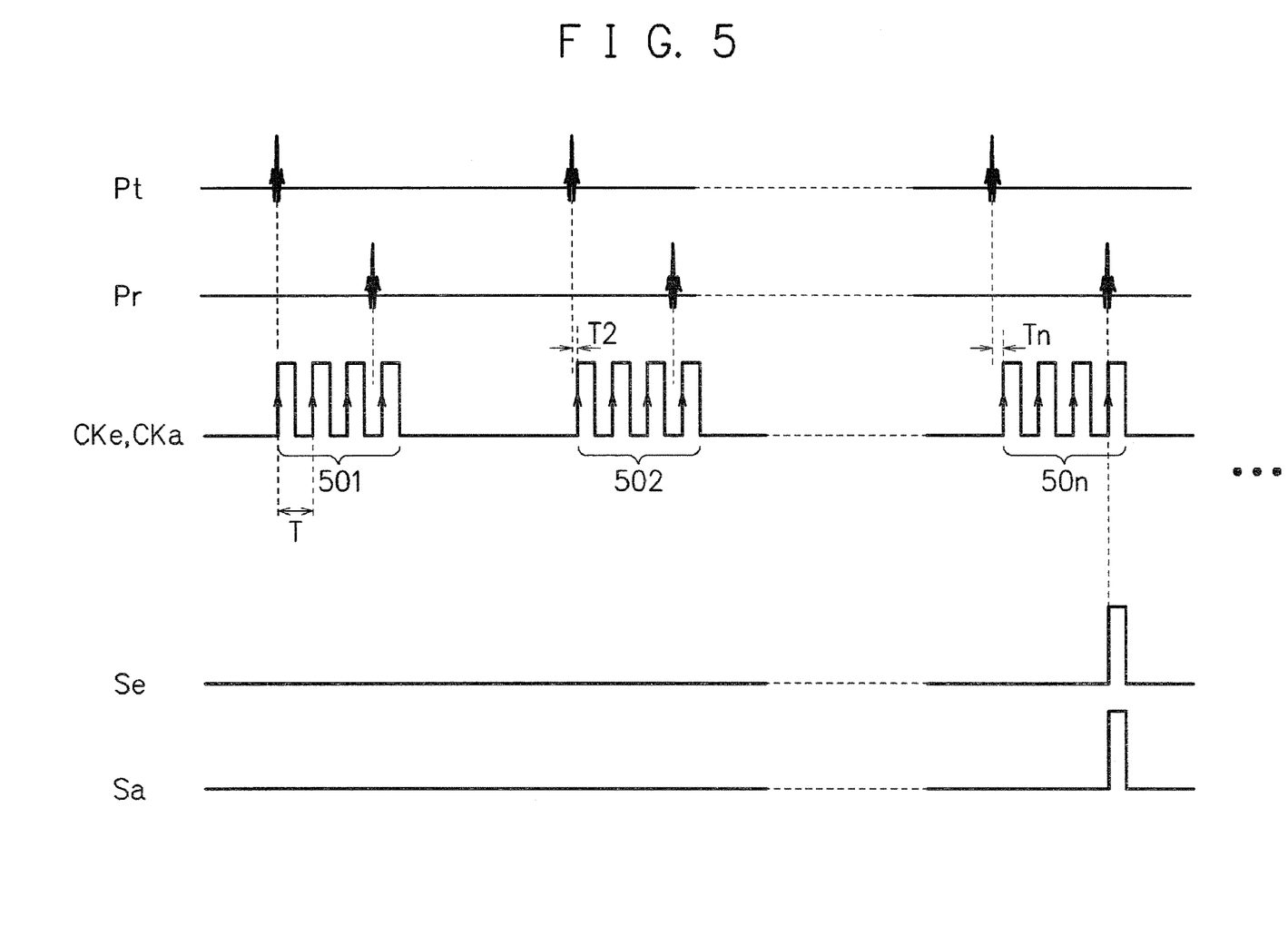
FIG. 5 is a timing diagram showing an operation of the radar device.

FIG. 4 is a diagram showing a configuration of a receiver of a radar device and FIG. 5 is a timing diagram of an operation of the receiver. An antenna 401 receives a reception pulse Pr. An amplifier 402 amplifies the signal received by the antenna 401. A band-pass filter 403 filters the signal amplified by the amplifier 402 and transfers only input signals within a predetermined frequency band to filter out noises. A level extraction circuit 404 extracts a level of the reception signal in synchronization with an intermittent clock CKe and outputs a signal Se. An analog-digital (A/D) converter 405 concerts the analog signal Se output from the level extraction circuit 404 into digital signal in synchronization with an intermittent clock CKa and outputs a signal Sa.

The radar device sends transmission pulses Pt and receives reflected waves of the transmission pulses Pt as reception pulses Pr. The transmission pulses Pt are repeated signals synchronized with a base clock. The intermittent clocks CKe and CKa have a first clock group 501, a second clock group 502, . . . , and a "n"th clock group 50$n$. The first clock group 501 is not delayed with respect to the transmission pulse Pt. The second clock group 502 is delayed by time T2 (=δ) with respect to the transmission pulse Pt. The "n"th clock group 50$n$ is delayed by time Tn (=(n−1)×δ) with respect to the transmission pulse Pt. The clocks CKe and CKa given to the level extraction circuit 404 and A/D converter 405 are intermittent clocks, in which clock start timings are shifted by δ to improve the distance resolution. Distance is detected by measuring time from the transmission of the transmission pulse Pt to a detection of the reception pulse Pr. Since the intermittent clocks CKe and CKa are shifted by & with respect to the transmission pulse Pt (base clock), the clocks cannot be sequential but intermittent by necessity in order to control the timings.

Figure 6:
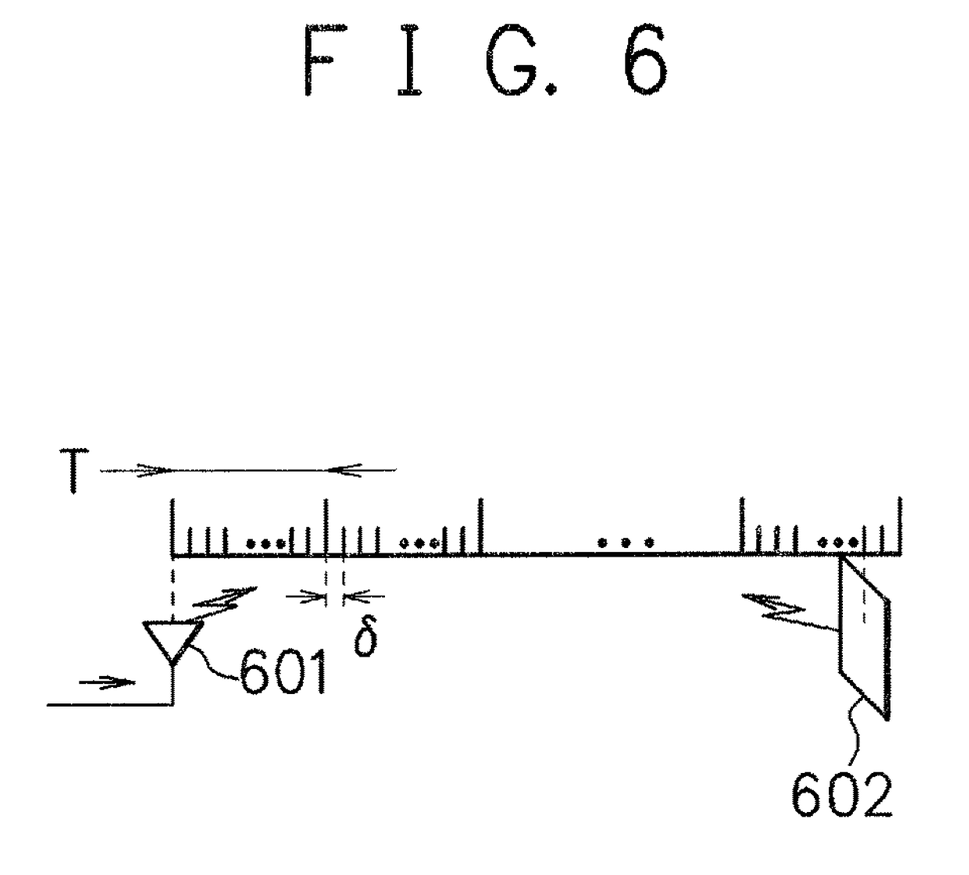
FIG. 6 is a diagram showing the distance detection method of the radar device.

FIG. 6 is a diagram explaining a distance detection method of the radar device. The radar device wirelessly transmits the transmission pulses Pt from an antenna 601 and receives pulse signals Pr reflected by a target (object to be measured) 602 to measure a distance from the target 602 based on the time difference between the transmission pulses Pt and the reception pulses Pr. The distance measurement resolution depends on a resolution of time periods T of the clocks CKe and CKa and a resolution of delay amount δ.

Figure 7:
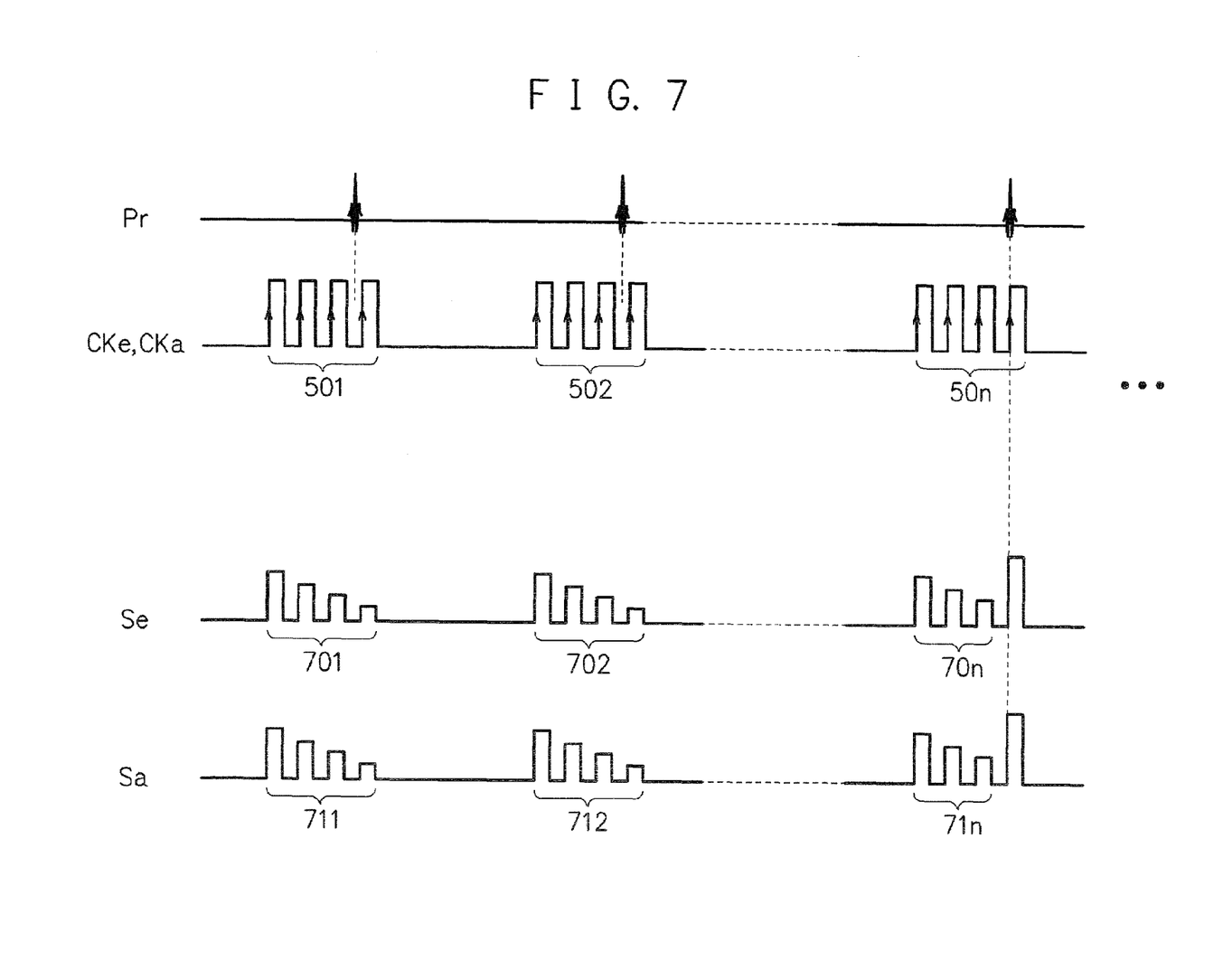
FIG. 7 is a timing diagram showing an operation of the radar device when a compound semiconductor element is used in a level extraction circuit.

FIG. 7 is a timing diagram corresponding to FIG. 5 and showing an operation of the radar device of FIG. 4 in a case that a compound semiconductor element is used in the level extraction circuit 404 of FIG. 4. When the band of the radar device is within a range achieved by a silicon CMOS technology (microwave of 3 to 10 GHz, etc.), signals can be detected using a method in which start timings of clocks CKe and CKa are shifted by δ, as shown in FIG. 5. However, when a frequency domain of quasi-millimeter band or larger band is used, it is difficult to realize the level extraction circuit 404 of the receiver using the silicon CMOS technology and accordingly a compound semiconductor element such as InP or GaAs elements are used. The compound semiconductor element shows a frequency dispersion characteristic due to an electron trap existing on a device surface, for example. The level extraction circuit 404 having a compound semiconductor element requires a certain period of time to be in a steady state from the start of the operation. FIG. 7 sows the condition. Since the clock CKe of the level extraction circuit 404 is intermittent, output signals Se include transient responses 701, 701 to 70n for a while after the level extraction circuit 404 shifts from a halt condition to a start condition. The transient responses 701 to 70n can cause an error detection. The A/D converter 405 converts the transient responses 701 to 70n in the signals Se from analog into digital and outputs pulses 711, 712 to 71n in the signals Sa. The pulses 711 to 71n are unnecessary pulses.

In order to distinguish between risings of the transient responses 701 to 70n of the signals Se output from the level extraction circuit 404 (invalid data) and pulses of the detected reception pulses Pr, the start of clock CKa given to the A/D converter 405 is delayed to maintain a certain period not to import the invalid data.

On the other hand, since the radar device using an Ultra Wide Band (UWB) transmits pulses having weak power, the reception pulses Pr reflected by a distant object can be lost among normal noises. Thus, it is required an operation for repeating same measurements and averaging obtained data to improve the signal-to-noise ratio (S/N ratio) and extend the maximum detectable distance. It is desired to provide a method that can remove a data invalid period considering the transient responses, in order to obtain more data within the whole measurement period and improve the S/N ratio.

Figure 1:
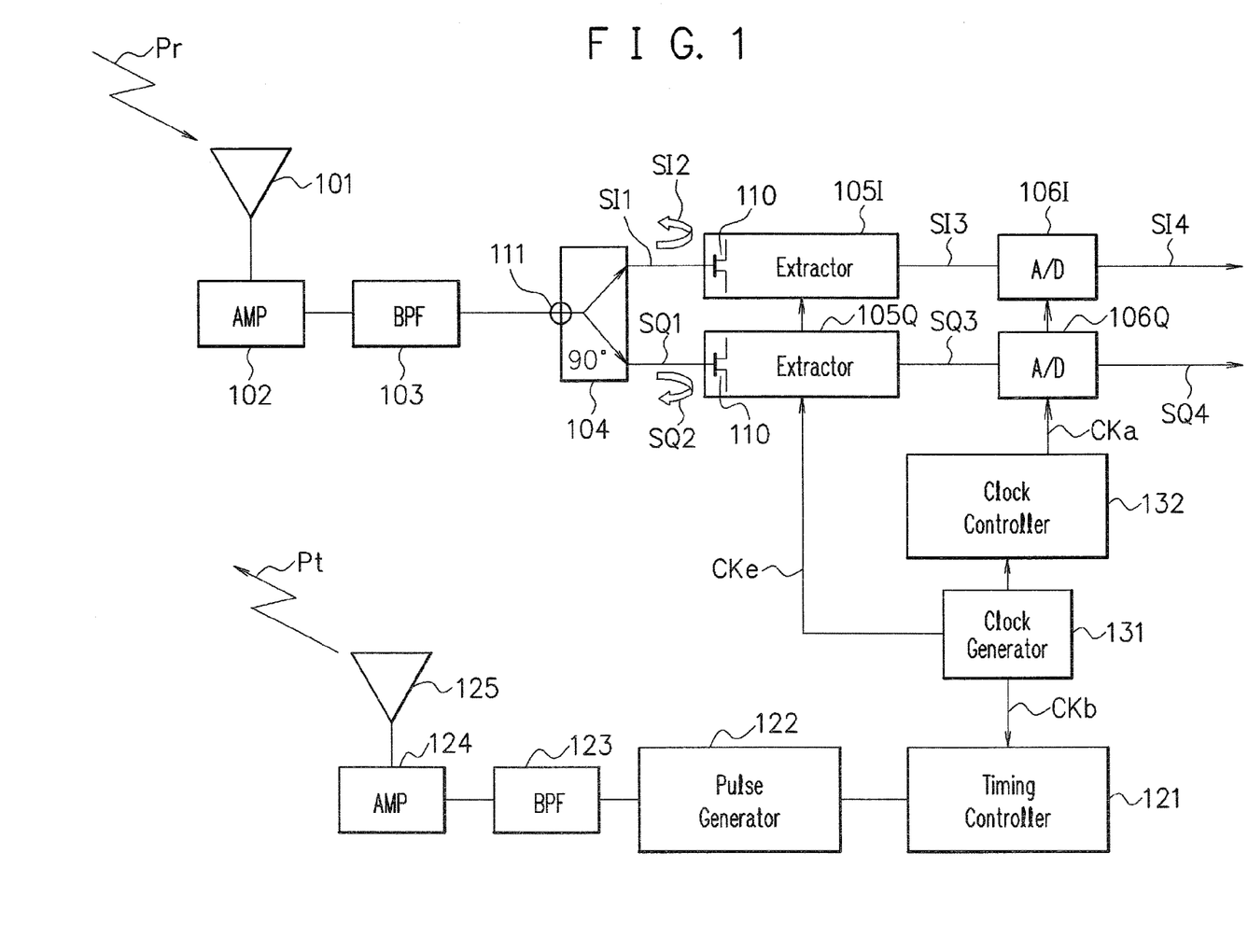
FIG. 1 is a block diagram showing a configuration of a short-distance radar device according to an embodiment of the present invention.
Figure 2:
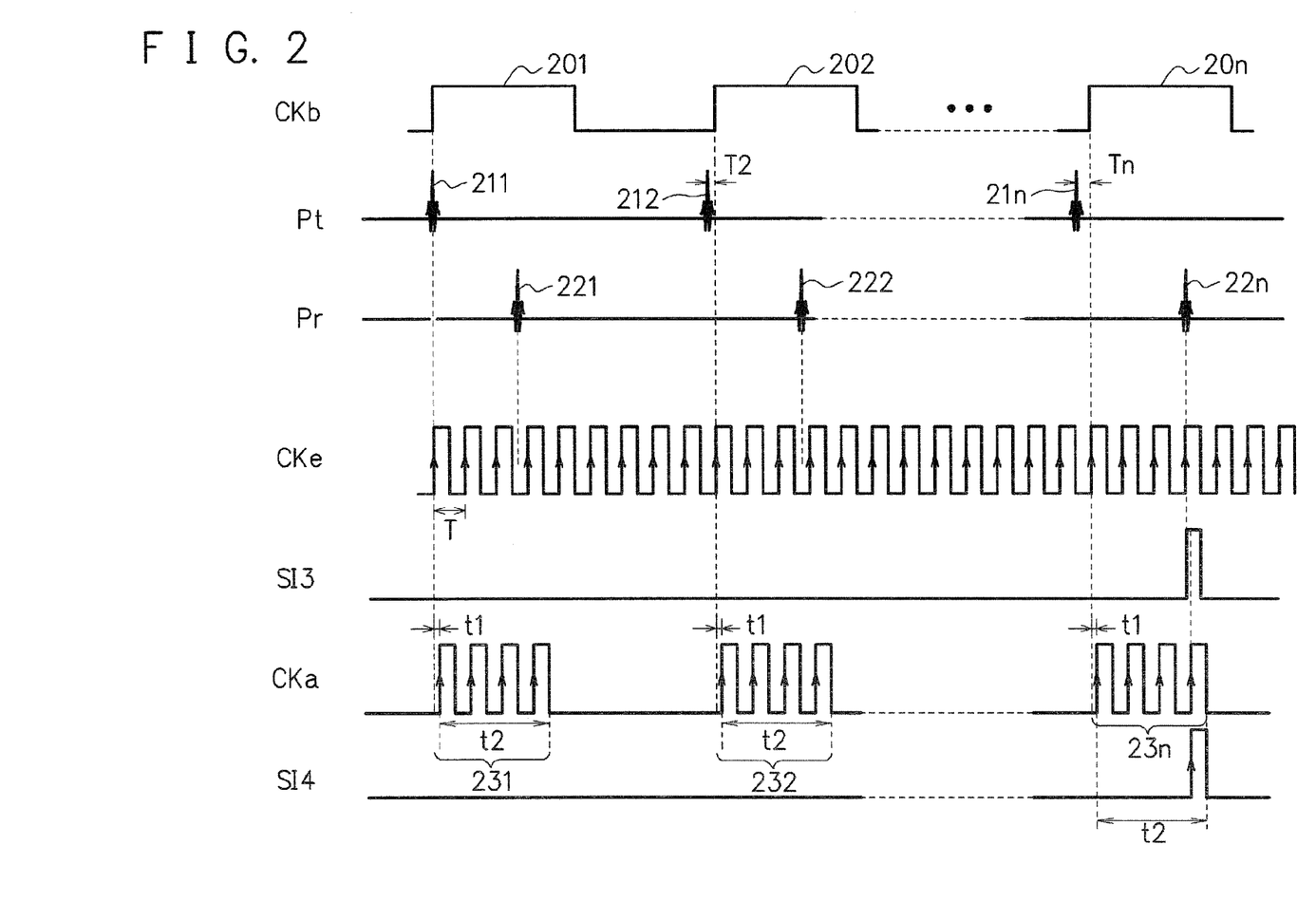
FIG. 2 is a timing diagram showing an operation of the radar device according to the present embodiment.

FIG. 1 is a block diagram showing a configuration of a short-distance radar device according to an embodiment of the present invention and FIG. 2 is a timing diagram showing an operation of the device.

The radar device has a transmitter and a receiver. The transmitter will be explained first. A clock generating circuit 131 generates a base clock CKb. A timing control circuit 121 increases a displacement amount of the base clock CKb with respect to each rising edge to control transmission timings of transmission pulses Pt and outputs the timings to a pulse generating circuit 122. The pulse generating circuit 122 generates transmission pulses Pt at the timings instructed by the timing control circuit 121. A band-pass filter 123 inputs the transmission pulses generated by the pulse generating circuit 122 and passes only the signals within a predetermined frequency band. A low-noise amplifier 124 amplifies the transmission pulses output from the band-pass filter 123 and outputs the transmission pulses to an antenna 125. The antenna 125 wirelessly transmits the transmission pulses Pt.

Next, the receiver will be described. The receiver receives reflected waves of the transmission pulses Pt transmitted from the antenna 125 as reception pulses Pr. The pulse signals are, for example, signals of Ultra Wide Band (UWB) including microwaves and quasi-millimeter waves, which are signals of 24 to 29 GHz.

The clock generating circuit 131 generates a continuous clock CKe based on the base clock CKb. The continuous clock CKe is a clock having a constant time period synchronized with the base clock CKb. The clock generating circuit 131 and a clock control circuit 132 generate intermittent clock CKa based on the base clock CKb. The intermittent clock CKa is delayed by a predetermined time t1 with respect to a rising edge of the base clock CKb and has a frequency same as the continuous clock CKe.

An antenna 101 wirelessly receives the reception pulses Pr. A low-noise amplifier 102 amplifies the signals received by the antenna 101. A band-pass filter 103 filters the signals amplified by the amplifier 102 and passes only the signals within the predetermined frequency band among the input signals to filter out noises.

A 90-degree hybrid circuit 104 distributes the output signals of the band-pass filter 103 to reception signals SI1 and SQ1 which have 90-degree phase differences with each other. A line of the reception signals SI1 is connected to an input terminal of a high-speed level extraction circuit 105I and a line of the reception signals SQ11 is connected to an input terminal of a high-speed level extraction circuit 105Q. For example, a distance between the input terminal 111 of the 90-degree hybrid circuit 104 and the input terminal of the high-speed level extraction circuit 105Q is greater, in an amount corresponding to a 90-degree phase, than the distance between the input terminal 111 and the input terminal of the high-speed level extraction circuit 105I. With this structure, the reception signal SQ1 is delayed by a 90-degree phase with respect to the reception signal SI1.

The high-speed level extraction circuit 105I has a gate of a input transistor 110 connected to the line of reception signal SI1, extracts a level of the reception signals SI1 in synchronization with the continuous clock signals Cke, and outputs signals SI3. The high-speed level extraction circuit 105Q has a gate of an input transistor 110 connected to the line of the reception signal SQ1, extracts a level of the reception signal SQ1 in synchronization with the continuous clock signals Cke, and outputs signals SQ3.

An analog-digital (A/D) converter 106I is synchronized with the intermittent clock Cka, converts the output signals SI3 of the high-speed level extraction circuit 105I from analog into digital, and outputs an I channel signal SI4. The A/D converter 106Q is synchronized with the intermittent clock CKa and converts the output signals SQ3 of the high-speed level extraction circuit 105Q, converts the output signals from analog signals into digital signals, and outputs a Q channel signal SQ4.

FIG. 2 shows, starting with the top, the base clock CKb, transmission pulse Pt, reception pulse Pr, continuous clock CKe, output signal SI3 of the level extraction circuit 105I, intermittent clock CKa, and output signal SI4 of the A/D converter 106I.

The continuous clock CKe and intermittent clock CKa are synchronized with the base clock CKb. Here, the intermittent clock CKa is delayed by a predetermined time t1 with respect to the base clock CKb. Thus, the receiver receives the reception pulses Pr in synchronization with rising edges of the base clock CKb.

The base clock CKb has a first pulse 201, a second pulse 202, ..., and an "n"th pulse 20n. The transmission pulse Pt has a first transmission pulse 211, a second transmission pulse 212, ..., and an "n"th transmission pulse 21n. The reception pulse Pr has a first reception pulse 221, a second reception pulse 222, ..., and an "n"th reception pulse 22n. The intermittent clock CKa has a first clock group 231, a second clock group 232, ..., and an "n"th clock group 23n.

The transmitter firstly transmits the first transmission pulse 211 without any displacement amount with respect to a rising edge of the first pulse 201 of the base clock CKb. The receiver receives the reflected wave of the first transmission pulse 211 as the first reception pulse 221.

Then, the transmitter transmits the second transmission pulse 212 at a displacement amount T2 with respect to a rising edge of the second pulse 202 of the base clock CKb. The displacement amount T2 is a certain length δ. The receiver receives the reflected wave of the second transmission pulse 212 as the second reception pulse 222.

Similarly, the transmitter transmits the "n"th transmission pulse 21n at a displacement amount Tn with respect to a rising edge of the "n"th pulse 20n of the base clock CKb. The displacement amount Tn is (n−1)×δ. The receiver receives the reflected wave of the "n"th transmission pulse 21n as the "n"th reception pulse 22n.

As described above, the first transmission pulse Pt is sent without a displacement amount with respect to each rising edge of the base clock CKb, the second one is sent δ earlier, the third one is sent 2δ earlier, the fourth one is sent 3δ earlier, and the "n"th one is (n−1)×δ earlier. The transmitter transmits transmission pulses Pt as increasing the displacement amount with respect to each edge (each rising edge or falling edge) of the base clock CKb. The displacement amount is increased by a certain amount δ.

The level extraction circuits 105I, 105Q are synchronized with the rising of the continuous clock CKe and extract levels of the reception signals SI1, SQ1. Then, while the continuous clock CKe is in a high level, the level extraction circuits 105I, 105Q maintain the extracted levels and output signals SI3, SQ3 and, while the continuous clock CKe is in a low level, the level extraction circuits 105I, 105Q output the output signals SI3, SQ3 in 0 level. The level extraction circuits 105I, 105Q have a operating speed capable of executing a level extraction for input signals in a frequency which is twice as the frequency of the reception signals and can serve the same function as a sample-and-hold circuit.

The A/D converters 106I, 106Q are synchronized with risings of the intermittent clock CKa and convert the signals SI3, SQ3 from analog into digital. Then, while the intermittent clock CKa is in a high level, the A/D converters 106I, 106Q maintain the converted digital value and output the output signals SI4, SQ4 and, while the intermittent clock CKa is in a low level, the A/D converters 106I, 106Q output the output signals SI4, SQ4 having digital values of 0.

The reception signal SQ1 is delayed by a 90-degree phase with respect to the reception signal SI1. The high-speed level extraction circuit 105I extracts the level of the reception signal SI1 and the high-speed level extraction circuit 105Q extracts the level of the reception signal SQ1. In this case, the reception pulse Pr can be detected with a higher degree of accuracy, compared to the case using both of the I channel signal SI4 and Q channel signal SQ4.

The level of the I channel signal SI4 is represented by "I," and the level of the Q channel signal SQ4 is represented by "Q." A baseband circuit inputs the I channel signals SI4, SQ4 and calculates $\sqrt{(I^2+Q^2)}$ to execute an envelope detection of the reception pulse Pr.

When the frequencies of the reception signals SI1, SQ1 become high, the gate lengths of the transistors 110 constituting the level extraction circuits 105I, 105Q are shortened the operation speed is increased. Thus, the input impedance of the level extraction circuits 105I and 105Q becomes high and reflected waves SI2, SQ2 are generated. However, when the 90-degree hybrid circuit 104 is provided in a stage prior to the level extraction circuits 105I and 105Q of high input impedance, the I channel reflected wave SI2 and Q channel reflected wave SQ2 cancel each other in the input terminal 111 of the 90-degree hybrid circuit 104. With this structure, an affect due to the reflected waves SI2, SQ2 can be prevented.

Further, when the frequencies of the reception signals SI1, SQ1 are low (3 to 10 GHz), the transistors 110 of the level extraction circuits 105I, 105Q can be composed of silicon MOS field effect transistors. However, when the frequencies of the reception signals SI1, SQ1 are high (larger than quasi-millimeter band), the transistors in the level extraction circuits 105I, 105Q require a compound semiconductor element (InP or GaAs element) which is capable of executing a high-speed operation. The compound semiconductor element is, for example, a high electron mobility transistor (HEMT) or a hetero bipolar transistor (HBT).

When a compound semiconductor element is used as the transistor and an intermittent clock is given to the level extraction circuits 105I, 105Q as shown in FIG. 7, transient responses 701 to 70n are generated in the output signals SI3, SQ3 of the level extraction circuits 105I, 105Q and this can cause an error detection.

According to the present embodiment, even when a compound semiconductor element is used in the transistor 110, since the continuous clock CKe is given to the level extraction circuits 105I, 105Q, transient responses in the output signals SI3, SQ3 of the level extraction circuits 105I, 105Q can be prevented and this reduces error detections. With this structure, distance can be detected with a high degree of accuracy. Further, since it is not required to wait for a period of transient responses, that is an invalid period, the maximum detectable distance can be lengthened.

Figure 3:
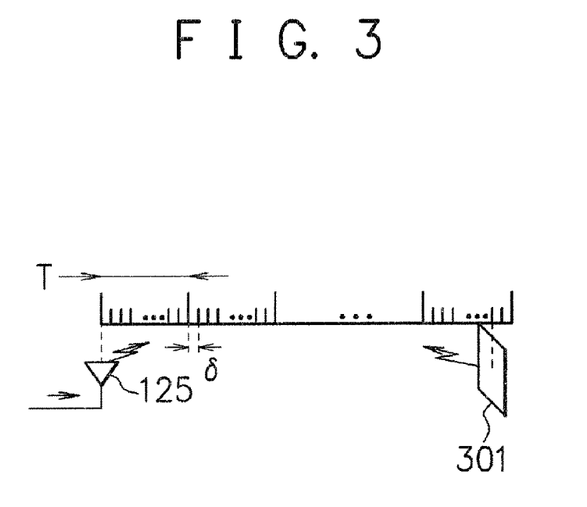
FIG. 3 is a diagram showing a distance detection method of the radar device according to the present embodiment.

FIG. 3 is a diagram showing a distance detection method of the radar device according to the present embodiment. The radar device wirelessly transmits a transmission pulse Pt via the antenna 125 and receives a pulse signal Pr reflected by the target (object to be measured) 301 to measure a distance to the target 301 based on a time difference between the transmission pulse Pt and the reception pulse Pr. The pulses Pt, Pr transmitted from and received by the radar device are pulses composed of a predetermined frequency among impulse waveforms. For example, the radar device is a UWB impulse radar and executes impulse communications.

When the time of arrival of the reception pulse 22n to the input terminal of the level extraction circuit 105I and the rising edge of the continuous clock CKe of the level extraction circuit 106I are matched, a reception pulse in the signal SI3 can be detected. The time from the transmission timing of the transmission pulse 21n to the detection timing of the pulse in the signal SI3 is measured and the distance to the target 301 can be obtained. Here, if only one measurement (a first time period of the base clock CKb) is executed, the expected accuracy of distance detection is determined only by a time period T of the continuous clock CKe of the level extraction circuits 106I, 106Q. In this case, since the reception pulse Pr is detected only when the rising edge of the continuous clock CKe and the timing of the reception signal Pr are matched, the resolution is relevant to the time period T. In order to obtain a higher degree of distance accuracy, the transmission timing of the transmission pulse 212 is made earlier by δ with respect to the rising edge of the base clock CKb in a second measurement (a second time period of the base clock CKb). Similarly, it is sent earlier by 2δ in the third measurement, by 3δ in the forth measurement, and by (n−1)×δ in the "n"th measurement. With this structure, when it is determined which clock the detected reception pulse is from, the distance to the target 301 can be obtained. In this case, the distance resolution becomes a resolution of displacement amount δ. For example, as shown in FIG. 2, when a pulse in the signal SI3 using a pulse in a "m"th (fourth, for example) in the "n"th clock group 23n, the distance to the target 301 can be obtained based on (m×T+n×δ)×c. Here, "c" represents a velocity of light and "T" represents a time period of the continuous clock CKe. Since the clock CKe of the level extraction circuits 105I, 105Q are continuous, the level extraction circuits 105I, 105Q keep extracting the level of the reception signals Pr; however, since the clock CKa of the A/D converter 106I, 106Q is intermittent, unnecessary data (intervals without clock CKa) is not imported.

The start point of the intermittent clock CKa is delayed by t1 with respect to the rising edge of the base clock CKb. The delay time t1 is the time of the reflected pulse Pr traveling to the input terminals of the A/D converters 106I, 106Q when a target is placed at an end of the transmission antenna 125 and at an end of the reception antenna 101 (the distance is 0).

The stop point of the intermittent clock CKa is delayed by t1+t2 with respect to a rising edge of the base clock CKb. The delay time t1+t2 is the time of the reflected pulse Pr traveling to the input terminals of the A/D converters 106I, 106Q when the target is in a position of maximum detectable distance. In other words, the length t2 of the respective clock groups 231 to 23n of the intermittent clock CKa corresponds to the maximum detectable distance to the target 301. A longer length t2 provides a longer maximum detectable distance.

As described above, according to the present embodiment, the continuous clock CKe is given to the level extraction circuits 105I, 105Q using a compound semiconductor element. The level extraction circuits 105I, 105Q always continue to output extracted data signals SI3, SQ3, and, since the intermittent clock CKa is given to the A/D converters 106I, 106Q, an unnecessary data import can be prevented. Further, obviously, in order to execute more measurements within a limited period of time, the clock CKa of the A/D converters 106I, 106Q can be made as a continuous clock to remove a period invalid to obtain data.

As shown in FIG. 7, when the level extraction circuits 105I, 105Q are made of InP compound semiconductor elements and the intermittent clock is given to the level extraction circuits 105I, 105Q, the period of transient responses can extend up to about 400 μs. According to the present embodiment, since the level extraction circuits 105I, 105Q are made of compound semiconductor elements and a continuous clock CKe is given to the level extraction circuits 105I, 105Q, it is possible to obtain data during the invalid period of 400 μs. With this structure, the maximum detectable distance can be lengthened. Further, error detections due to transient responses are prevented and a correct distance to the target is detected.

The present embodiment is preferably applied to a short-distance radar device such as a UWB impulse system so that a UWB short-distance radar device, which uses a frequency band larger than a quasi-millimeter band, can be realized and the maximum detectable distance can be improved.

It is noted that the above-described embodiment is a detailed example to implement the present invention and the technical scope of the present invention should not be limited by the descriptions. That is, various modifications and changes can be made within the technical idea and characteristics of the present invention.

What is claimed is:
1. A radar device comprising:
a clock generator generating a base clock;
a transmitter transmitting transmission pulses as gradually increasing a displacement amount with respect to each edge of the base clock; and
a receiver receiving reflected waves of the transmitted transmission pulses in synchronization with the edges of the base clock.
2. The radar device according to claim 1, wherein
said receiver comprises an extractor extracting a level of received signals in synchronization with a continuous clock.
3. The radar device according to claim 2, wherein
the extractor comprises a compound semiconductor element.
4. The radar device according to claim 3, wherein
the compound semiconductor element is a high electron mobility transistor or a hetero bipolar transistor.
5. The radar device according to claim 1, wherein
said receiver comprises an analog-digital converter converting a reception signal from analog to digital in synchronization with an intermittent clock.
6. The radar device according to claim 1, wherein
said receiver comprises an extractor extracting a level of received signals in synchronization with a continuous clock and an analog-digital converter converting the extracted level from analog to digital in synchronization with an intermittent clock.
7. The radar device according to claim 6, wherein
the extractor comprises a compound semiconductor element.
8. The radar device according to claim 7, wherein
the compound semiconductor element is a high electron mobility transistor or a hetero bipolar transistor.
9. A processing method of a radar device, comprising:
generating a base clock;
transmitting transmission pulses as gradually increasing a displacement amount with respect to each edge of the base clock; and
receiving reflected waves of the transmitted transmission pulses in synchronization with the base clock.
10. The processing method according to claim 9, wherein the displacement amount increases by a certain amount.
11. The processing method according to claim 9, wherein the transmission pulses are shifted earlier with respect to each edge of the base clock.

* * * * *